Figure 1:
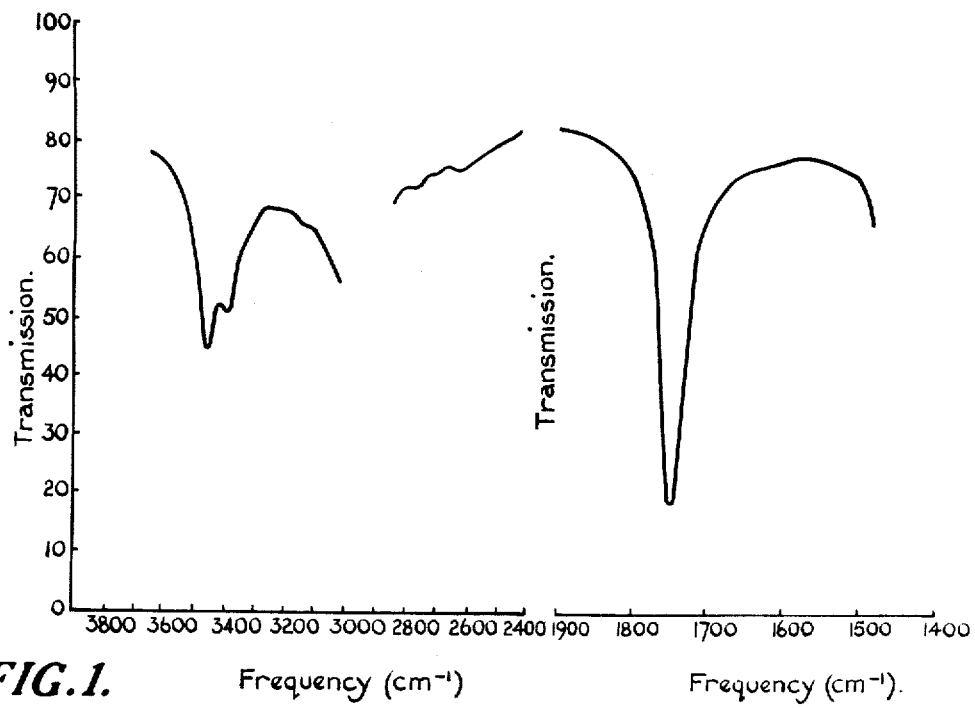
Figure 2:
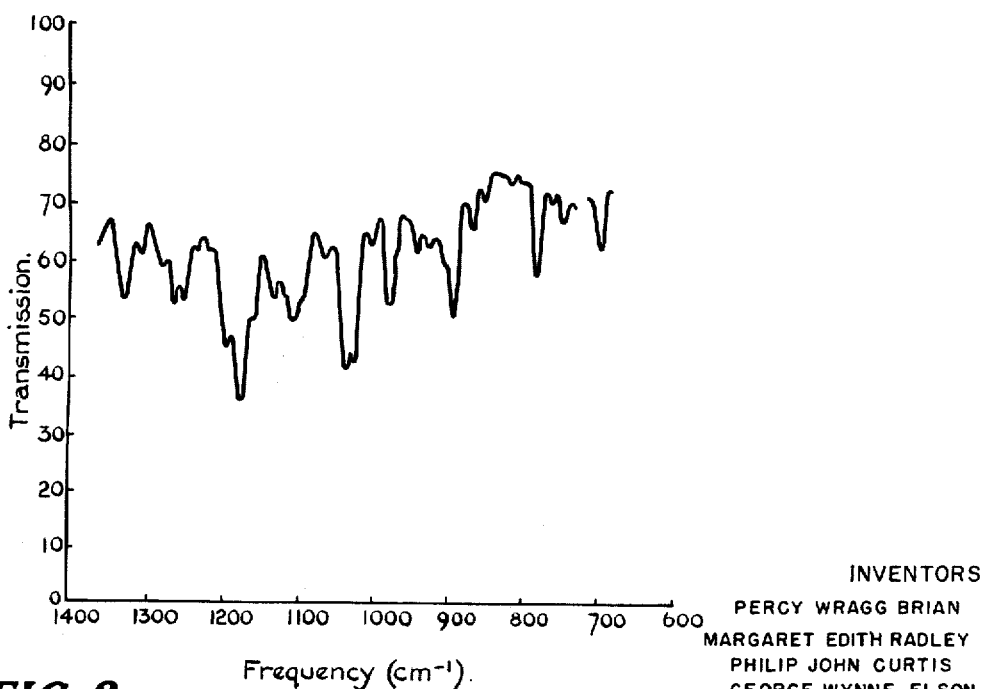

United States Patent Office 2,842,051
Patented July 8, 1958

2,842,051
GIBBERELLIC ACID COMPOUNDS, AND PREPARATION AND USE THEREOF

Percy Wragg Brian, Margaret Edith Radley, Philip John Curtis, and George Wynne Elson, Welwyn, England, assignors to Imperial Chemical Industries Limited, London, England, a corporation of Great Britain Application June 27, 1955, Serial No. 518,226

Claims priority, application Great Britain June 30, 1954

11 Claims. (Cl. 71—2.5)

This invention relates to a new organic acid having plant growth promoting properties, and to active derivatives thereof, in particular salts and esters. The invention further relates to a method of producing the acid by a metabolic process. The invention further relates to compositions for agricultural use containing the new acid or an active derivative thereof.

We have found that from a culture of *Gibberella fujikuroi* (Sawada) Wollenweber (= *Fusarium moniliforme* Sheldon) there may be extracted a new organic acid having the property of promoting plant growth. This acid is hereinafter termed gibberellic acid.

The present invention therefore provides a new chemical compound, gibberellic acid, such as is obtainable from a culture of *Gibberella fujikuroi*, the acid being characterised by the following properties:

Melting point, 233–235° C. (vigorous gas evolution)
Optical rotation, $[a]_D^{20}$ +83° (c., 0.51 in methanol)
Monomethyl ester:
 Melting point, 209–210° C.
 Optical rotation, $[a]_D^{16}$ +75° (c., 0.5 in ethanol)
p-Bromophenacyl ester:
 Melting point, 218–219° C.
 Hydrolysis with boiling mineral acid—1 mole carbon dioxide evolved
Acetyl derivative:
 Melting point, 233–234° C. (dec.)
 Optical rotation, $[a]_D^{17}$ +152° (c., 0.5 in ethanol)
Methyl acetyl gibberellate:
 Melting point, 180–181° C.
 Optical rotation, $[a]_D^{18}$ +150° (c., 0.4 in ethanol)

Infra-red absorption curve (Nujol "mull") of material crystallised from ethyl acetate-light petroleum (B. P. 60–80° C.) as shown in the accompanying drawing.

X-ray powder diffraction lines as shown in Table I. The intensities "I" of the lines on the powder photographs are estimated by reference to the strongest line which is assigned an intensity of 10.

TABLE I

X-ray powder diffraction lines of gibberellic acid (ex ethyl acetate)

| Spacing "d" | Intensity "I" | Spacing "d" | Intensity "I" |
|---|---|---|---|
| 10.20 | 5b | 2.786 | 1 |
| 8.73 | 2b | 2.687 | 1 |
| 7.33 | 5b | 2.549 | 2 |
| 6.69 | w | 2.485 | 2 |
| 6.01 | 5b | 2.418 | w |
| 5.31 | 10b | 2.350 | 1 |
| 5.06 | ½ | 2.305 | 1 |
| 4.84 | 3½ | 2.249 | w |
| 4.60 | 7 | 2.172 | 1 |
| 4.33 | 3 | 2.120 | 1 |
| 4.03 | 3 | 2.040 | w |
| 3.85 | w | 2.003 | w |
| 3.714 | 3 | 1.971 | w |
| 3.591 | 3 | 1.936 | w |
| 3.389 | 1½b | 1.929 | w |
| 3.214 | 1 | 1.863 | w |
| 3.085 | w | 1.853 | w |
| 2.993 | 1½ | 1.780 | w |
| 2.882 | 1½ | 1.698 | w |

*w* denotes a weak reflection.
*b* denotes a broad diffuse reflection.
The third figure beyond the decimal point is barely significant.

The invention also provides derivatives of gibberellic acid, in particular salts and esters thereof, having plant growth-promoting properties. Examples of the esters include alkyl esters and, specifically, the methyl, ethyl, isopropyl, butyl and octyl esters. Compounds in which the alcoholic hydroxyl groups of gibberellic acid are esterified with aliphatic or aromatic acids, specifically acetic, butyric and benzoic acids, comprise an additional type of ester of gibberellic acid. The salts preferably utilized are the alkali metal salts and other salts such as the alkaline earth salts, e. g., calcium.

The present invention also provides mixtures having plant growth-promoting properties comprising gibberellic acid, or an active derivative thereof, and a diluent. The diluent may be liquid or solid and may consist of or contain plant nutrients, particularly sources of nitrogen.

Further, the present invention provides a process of producing gibberellic acid, or mixtures containing said acid, from a culture of *Gibberella fujikuroi*.

Gibberellic acid may be produced by *Gibberella fujikuroi* when grown as a surface culture or as a deep, stirred and aerated culture in a suitable aqueous medium. A suitable medium must contain a carbon source (e. g. sucrose, glucose or glycerol, at 2–30% w./v.), an ammonium salt or a nitrate or a digest of protein (e. g. peptone) as nitrogen source (to give a concentration of N in the medium of 0.01–0.5%, a concentration of 0.08% being generally suitable), a magnesium salt (e. g. magnesium sulphate heptahydrate at 0.05% or thereabouts, which also conveniently adds sulphate which is also necessary but which may be added in some other form if another salt of magnesium is used), a phosphate (e. g. potassium dihydrogen phosphate at 0.05–0.5%, 0.1% being a suitable concentration), a potassium salt (which may be conveniently the phosphate, see above) and traces (ca. 1–10 p. p. m. of metal) of salts of iron, copper, zinc, manganese and a trace (1–10 p. p. m. of metal) of a molybdate.

Fermentations can be conveniently carried out at a temperature in the range 25–33° C.

Not all strains of the fungus produce gibberellic acid. Results of tests carried out on a variety of strains do indicate however that strains isolated from rice seedlings infected with the "bakanae" disease are more likely to produce gibberellic acid than strains isolated from other host plants such as cotton, maize and pineapple. Of strains found on sugar cane some are active in producing gibberellic acid, others are not. Strains of the fungus which produce the acid are morphologically indistinguishable from strains which produce none, and whether or not a strain is active can be determined only by growing it and testing the culture.

Strains of *Gibberella fujikuroi* which do produce gibberellic acid are the so-called "Sawada" and "Miyake" strains obtainable from the Centraalbureau voor Schimmelcultures at Baarn, Holland. Four strains numbered 1001, 1004, 1135 and 1139 in our collection of moulds are also productive of gibberellic acid. Samples of these strains have been deposited with the Centraalbureau and with the Commonwealth Mycological Institute, Kew, Surrey. Cultures of these strains when grown as described herein will contain gibberellic acid.

A method of obtaining gibberellic acid comprises generally the following steps:

(i) Growth of a mould culture in an aqueous medium;
(ii) Filtration and extraction of the medium with an adsorbent;
(ii) Elution of the adsorbent;
(iv) Purification of the acid obtained by the elution.

Gibberellic acid has been produced in still and in stirred culture using Raulin-Thom medium containing sucrose as the carbon source.

EXAMPLE I

For still culture the Raulin-Thom medium was dispensed in one litre portions in earthenware vessels and the cultures incubated for about ten days at 25°. Incubation of stirred cultures lasted three to five days at 25°. The culture filtrate, of pH 4 or less (adjusted with N-hydrochloric acid if necessary), was extracted with 10 g./l. of B. D. H. activated charcoal. The air dried charcoal (containing 20 to 30% moisture) was continuously eluted with acetone, and the eluate evaporated under reduced pressure to give an aqueous concentrate which was extracted twice with at least an equal volume of ethyl acetate. The combined ethyl acetate solutions were extracted twice with 25% of their volume of phosphate buffer pH 6.3 (136 g. $KH_2PO_4$ and 24 g. KOH in 1 l. of water). The buffer extracts were combined, adjusted to pH 3.8, and extracted twice with an equal volume of ethyl acetate. On concentrating these extracts, crude gibberellic acid crystallised in yields of about 40 mg./l. The crude acid was purified by adding an equal volume of light petroleum (60–80° C.) to a solution in boiling ethyl acetate. Repetition of this process gave pure gibberellic acid as jagged lathes decomposing at 233–235° C., optical rotation $[\alpha]_D^{19}$ +86° (c., 2.12 in ethanol). (Found: C, 65.9, 65.85; H, 6.6, 6.55. Eq. wt., 342. $C_{19}H_{22}O_6$ requires C, 65.9; H, 6.4% eq. wt. (monobasic) 346.) The molecular weight has been confirmed by the X-ray method. The unit cell was tetragonal and had $a=b=10.905$, $c=28.74$ A. The density was 1.34±0.01, whence the molecular weight (8 molecules per unit cell) is 345.

Direct extraction of the culture filtrate with organic solvent will remove gibberellic acid but not so effectively as when charcoal is used as in the above Example I.

The empirical formula for the acid and derivatives would be

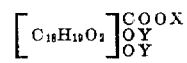

where X may be hydrogen, alkyl or aryl radical or metal and Y may be hydrogen or acyl radical.

Gibberellic acid gives a methyl ester, M. P. 209–210° C., optical rotation $[\alpha]_D^{16}$ +75° (c., 0.5 in ethanol) (found: C, 66.65; H, 6.85; OMe, 8.5. $C_{20}H_{24}O_6$ requires C, 66.65; H, 6.7; OMe, 8.6%), with either diazomethane or methyl iodide and potasium carbonate in acetone. The p-bromophenacyl ester has M. P. 218–219° C. (found: C, 57.65; H, 5.0; Br, 14.35. $C_{27}H_{27}O_7Br$. $H_2O$ requires C, 57.75; H, 5.2; Br, 14.2%). Acetylgibberellic acid, M. P. 233–234° C. (dec.) optical rotation $[\alpha]_D^{17}$ +152° (c., 0.5 in ethanol) (found: C, 65.1; H, 6.35; $C_{21}H_{24}O_7$ requires C, 64.9; H, 6.2%), prepared with acetic anhydride in pyridine at room temperature, yields a methyl ester, M. P. 180–181° C. optical rotation $[\alpha]_D^{18}$ +150° (c., 0.4 in ethanol) (found: C, 65.3; H, 6.7. $C_{22}H_{26}O_7$ requires C, 65.65; H, 6.5%), also obtained by acetylating methyl gibberellate.

As further examples of alkyl esters of gibberellic acid the following were prepared in each case by interaction of the carboxyl group of gibberellic acid and the appropriate diazohydrocarbon in a suitable solvent: ethyl gibberellate forms a hemi-methanolate, prismatic needles, M. P. 150–151° C. (found: C, 66.6; H, 7.6. $C_{21}H_{26}O_6$, ½$CH_4O$ requires C, 66.2; H, 7.2%) which on being heated to 140° C. in vacuo yields the solvent-free ester, M. P. 155–156° C. (found: C, 67.3; H, 7.2. $C_{21}H_{26}O_6$ requires C, 67.4; H, 7.0%). Isopropyl gibberellate forms a hemi-methanolate, needles, M. P. 151–152° C. (found: C, 66.5; H, 7.7. $C_{22}H_{28}O_6$, ½$CH_4O$ requires C, 66.8; H, 7.5%). Butyl gibberellate hemi-methanolate forms prismatic needles, M. P. 152–153° C. (found: C, 67.6; H, 7.7. $C_{23}H_{30}O_6$, ½$CH_4O$ requires C, 67.4; H, 7.7%). Octyl gibberellate forms prismatic needles, M. P. 157–159° C. (found: C, 70.2; H, 8.3. $C_{27}H_{38}O_6$ requires C, 70.7; H, 8.4%).

Further examples of esters formed by acylation of an hydroxyl group in gibberellic acid are: butyryl gibberellic acid, M. P. 192° C. (found: C, 66.1; H, 7.0. $C_{23}H_{28}O_7$ requires C, 66.2; H, 6.8%) prepared with butyric anhydride in pyridine at room temperature, and benzoyl gibberellic acid, M. P. 204–205° C. (found: C, 69.2; H, 5.9. $C_{26}H_{26}O_7$ requires C, 69.3; H, 5.8%) prepared with benzoyl chloride in pyridine at room temperature.

Examples of derivatives of gibberellic acid in which the carboxyl group is esterified and an hydroxyl group is acylated are as follows: ethyl acetyl gibberellate, M. P. 202–204° C. (found: C, 66.0; H, 6.9. $C_{23}H_{28}O_7$ requires C, 66.3; H, 6.8%), isopropyl acetylgibberellate, M. P. 202–203° C. (found: C, 66.7; H, 7.1. $C_{24}H_{30}O_7$ requires C, 67.0; H, 7.0%), butyl acetylgibberellate, M. P. 147–149° C. (found: C, 67.1; H, 7.2. $C_{25}H_{32}O_7$ requires C. 67.5; H, 7.3%), ethyl butyrylgibberellate, M. P. 175–176° C. (found: C, 67.2; H, 7.5. $C_{25}H_{32}O_7$ requires C, 67.5; H, 7.3%) and ethyl benzoylgibberellate, M. P. 192° C. (found: C, 70.5; H, 6.5. $C_{28}H_{30}O_7$ requires C, 70.3; H, 6.3%), and octyl acetylgibberellate which consist of a colourless syrup, B. P. 195–202° C. (bath temperature)/ $5 \times 10^{-5}$ mm. (found: C, 69.6; H, 8.0. $C_{29}H_{40}O_7$ requires C, 69.6; H, 8.1%).

Diacetylgibberellic acid prepared by allowing gibberellic acid to react with acetic anhydride in pyridine at room temperature for 5 days formed prisms, M. P. 186.5–187° C. (found: C, 64.25; H, 6.15. $C_{23}H_{26}O_8$ requires C, 64.2; H, 6.1%). Methyl diacetylgibberellate was prepared by the action of excess ethereal diazomethane on a methanolic solution of diacetylgibberellic acid. It crystallised from methylene chloride-light petroleum (B. P. 60-80° C.) and from acetone-light petroleum (B. P. 60-80° C.) in massive prisms, M. P. 166.5-168.5° C. (found: C, 65.1; H, 6.45. $C_{24}H_{28}O_8$ requires C, 64.85; H, 6.35%).

An example of the procedure utilized to prepare the methyl ester of gibberellic acid is shown in the following example.

EXAMPLE II (A) A solution of 207 mg. of gibberellic acid in 7 ml. of methanol was cooled to 0° C. and an excess of diazomethane in ether was added with stirring. Five hours after the completion of the addition, the solution was placed on a water-bath and rapidly evaporated to dryness. The residue was crystallised from a benzene-methanol mixture to give 159 mg. of methyl gibberellate melting at 208-210° C. After a second crystallisation, the ester melted at 209-210° C. and had an optical rotation of $[\alpha]_D^{16}$ +75, when determined in a 0.5 percent solution in ethanol.

(B) A mixture of 125 mg. of gibberellic acid, 0.3 ml. of methyl iodide, 0.7 g. of anhydrous potassium carbonate and 7 ml. of dry acetone was heated under reflux for 8 hours. The acetone was distilled off and the residue washed with water and dried. Repeated crystallisation from a mixture of ethyl acetate and benzene gave methyl gibberellate melting at 204-205° C.

Of coure, the other esters, as generally noted heretofore, can similarly be prepared.

The preparation of an ester from reaction of the gibberellic acid with an acyl-group-containing compound is illustrated by the following example, which shows the general method of preparation of such esters.

EXAMPLE III

To a solution of 113 mg. of gibberellic acid in 1.8 ml. of pure dry pyridine was added 1 ml. of acetic anhydride. The mixture was left for 45 hours at room temperature and then the solution was placed on a water-bath and the solvents were rapidly distilled off in vacuo. The residue was dissolved in sodium bicarbonate solution, the solution filtered, and the filtrate acidified with hydrochloric acid. The resulting precipitate was collected by filtration and crystallised from a mixture of ethyl acetate and light petroleum (B. P. 60-80° C.) giving acetylgibberellic acid as rhombs melting at 233-234° C. (decomposition) and having an optical rotation of $[\alpha]_D^{17}$ +152°, when determined in a 0.5 percent solution in ethanol.

It should be stressed that other esters of gibberellic acid are within the scope of this invention, as, for example, the glycol and phenyl esters. The foregoing are merely by way of illustration.

In addition, it should be noted that various salts of gibberellic acid have been prepared. Particularly the alkali metal and alkaline earth salts are of interest, as for example: sodium gibberellate sesquihydrate, indefinite M. P. at 230-238° C. (decomposition) (found: C, 57.4; H, 6.15. $2C_{19}H_{21}O_6Na, 3H_2O$ requires C, 57.7; H, 6.12%), potassium gibberellate sesquihydrate, indefinite M. P. at 225-229° C. (decomposition) (found: C, 55.6; H, 5.7. $2C_{19}H_{21}O_6K, 3H_2O$ requires C, 55.5; H, 5.9%) and calcium gibberellate trihydrate, decomposition at 230-270° C. (found: C, 58.7; H, 6.0. $(C_{19}H_{21}O_6)_2Ca, 3H_2O$ requires C, 58.2; H, 6.2%).

The following example illustrates a method for preparing the sodium salt of gibberellic acid. It can be appreciated that the other salts generally noted heretofore can be similarly prepared.

EXAMPLE IV

A solution of gibberellic acid (94.03 mg.) in methanol which had been freshly distilled over sodium hydroxide (3 ml.) was treated dropwise with the calculated volume (10.93 ml.) of approximately 0.02 N carbonate-free, aqueous sodium hydroxide, the volume being calculated on the basis of a parallel titration, to phenolphthalein, of an aliquot portion (58.20 mg.) of gibberellic acid which required 6.76 ml. of the alkali solution for neutralization. The first mentioned solution of sodium gibberellate was rapidly evaporated under reduced pressure at room temperature. The residual sodium salt was dried for 7 days in a vacuum desiccator over phosphorus pentoxide; it consisted of transparent flakes, which disintegrate at ca. 160° C. to a white powder becoming yellow-brown at 210-215° C. and melting at 230-238° C. with decomposition, of sodium gibberellate sesquihydrate (found: C, 57.4; H, 6.15. $2C_{19}H_{21}O_6Na, 3H_2O$ requires C, 57.7; H, 6.12%).

To obtain maximum yields in stirred cultures it is necessary to carry fermentation on for what is a long time by usual standards. This is shown by the following yield/time data for 100 litre batch of Raulin-Thom medium containing 4% sucrose, initially adjusted to pH 3.5 and at 25° C.

TABLE II

| Hrs. fermentation | Yield (mg./l.) |
|---|---|
| 93 | 18 |
| 117 | 33 |
| 141 | 39 |
| 164 | 82 |
| 187 | 105 |
| 212 | 92 |
| 236 | 138 |
| 262 | 160 |
| 284 | 189 |
| 331 | 193 |
| 402 | 249 |

The time at which gibberellic acid begins to accumulate in a culture of a suitable strain of *Gibberella fujikuroi* and the final yield of gibberellic acid are influenced by the concentrations of the carbon source and nitrogen source and by the ratio of these two concentrations in the medium used.

The following examples are given in illustration.

A gibberellic acid producing strain of the mould was grown in 30 litre batches of a medium of the following composition:

| | | |
|---|---|---|
| Magnesium sulphate | gm | 30 |
| Potassium dihydrogen phosphate | gm | 150 |
| Minor element concentrate [1] | ml | 60 |
| Glucose monohydrate, ammonium nitrate, water (see below) | l | 30 |

[1] The composition of the minor element concentrate was:

| | | |
|---|---|---|
| $FeSO_4 \cdot 7H_2O$ | gm | 0.1 |
| $CuSO_4 \cdot 5H_2O$ | gm | 0.015 |
| $ZnSO_4 \cdot 7H_2O$ | gm | 0.1 |
| $MnSO_4 \cdot 7H_2O$ | gm | 0.01 |
| $K_2MoO_4$ | gm | 0.01 |
| Water | ml | 100 |

The medium was stirred, aerated at a rate of 10 litres/minute and maintained at a temperature of 25° C. The pH value of the medium was adjusted to 4.5 before sterilizing.

Yields of gibberellic acid (mg./l.) at various times during fermentation on media containing different concentrations of glucose and ammonium nitrate are given in the following tables.

TABLE III

*Yield of gibberellic acid (mg./l.)*

| Glucose Monohydrate | Hours of fermentation | Concentration of NH₄NO₃ (g./l.) | | | |
|---|---|---|---|---|---|
| | | 1.2 | 2.4 | 4.8 | 9.6 |
| 16% | 120 | | | | |
| 16% | 161 | 19 | | | |
| 16% | 195 | | | | |
| 16% | 212 | | 59 | | |
| 16% | 219 | 40 | | | |
| 16% | 258 | 61 | 146 | 44 | 49 |
| 16% | 330 | 102 | 114 | 204 | 5 |
| 16% | 402 | 139 | 312 | 204 | 4 |
| 4% | 138 | | | | |
| 4% | 168 | | | | |
| 4% | 185 | 65 | 34 | | |
| 4% | 210 | | | 4 | 5 |
| 4% | 282 | 100 | 71 | 8 | 8 |
| 4% | 305 | 107 | 71 | 5 | 7 |
| 2% | 100 | | | | |
| 2% | 114 | | | | |
| 2% | 137 | | 5 | | |
| 2% | 161 | 41 | 5 | 2 | |
| 2% | 185 | 42 | 7 | | |
| 20% | 139 | | 3 | | |
| 20% | 163 | | 20 | | |
| 20% | 235 | | 123 | | |
| 20% | 259 | | 134 | | |
| 20% | 283 | | 162 | | |
| 20% | 307 | | 189 | | |
| 20% | 331 | | 244 | | |
| 20% | 402 | | 364 | | |
| 20% | 426 | | 368 | | |
| 20% | 474 | | 408 | | |
| 20% | 618 | | 544 | | |
| 20% | 666 | | 424 | | |
| 20% | 738 | | 465 | | |
| 20% | 785 | | 501 | | |

These results show (a) the yield of gibberellic acid increases with increasing ratio of glucose/NH₄NO₃; (b) the yield of gibberellic acid increases with increasing glucose;

TABLE IV

*Yield of gibberellic acid (mg./l.)*

| Percent NH₄NO₃ | 0.96 | 0.48 | 0.24 | 0.12 |
|---|---|---|---|---|
| Percent Dextrose: | | | | |
| 16 | 94 | 211 | 310 | 148 |
| 8 | 5 | 60 | 185 | 200 |
| 4 | 13 | | 54 | 118 |
| 2 | 5 | 5 | 8 | 50 |

(c) in media of given glucose concentration production of gibberellic acid commences soonest in media of low NH₄NO₃ concentration; (d) in media of given NH₄NO₃ concentration production of gibberellic acid commences soonest in media of low glucose concentration; (e) gibberellic acid is produced by the fungus only during times when it is accumulating or subsisting upon internal reserves of fat and carbohydrate, that is to say when active growth of the fungus has been checked by exhaustion of either the nitrogen or carbon in the nutrient. The best conditions for production of the acid appear to be those in which nitrogen is the factor which limits active growth and carbon is in excess though, of course, it is necessary that sufficient nitrogen be originally present in the nutrient to permit adequate growth of the fungus before acid production commences.

In general, high yields of gibberellic acid are obtained by growing the mould in a nutrient containing from 0.2–0.3% ammonium nitrate (or equivalent source of nitrogen) and from 10–30% glucose (or equivalent source of carbon) i. e., from 0.07–0.1% N and from 3.5–10% C.

Gibberellic acid, and certain of its derivatives such as salts and esters particularly acetyl gibberellic acid, diacetyl gibberellic acid, butyryl gibberellic acid and monobenzoyl gibberellic acid have the property of promoting the growth of plants, as is shown by the following description of experiments on wheat and pea seedlings and grass.

When wheat seedlings are grown in water culture and gibberellic acid is added to the culture solution in proportions of from 1–10 parts per million of solution, the seedlings grow taller than untreated plants. Increases in height of the order of 50% are common, the increase being due to (a) a great increase in length of the mesocotyl and (b) a smaller increase in the length of later internodes and of leaves. The leaves, although larger, are narrower than those of untreated plants. The enlarged plants are paler in colour than untreated plants in solutions of low nutrient status but this effect can be offset by increasing the concentration of nutrients in the culture solution.

Results from four experiments, where gibberellic acid was supplied in the culture solution at 5 p. p. m., are summarised in Table V. It will be seen that (a) fresh weight and dry weight of shoots are fairly consistently increased; (b) fresh weight and dry weight of roots are reduced, particularly in the low-level nutrient. The original data from which Table V was compiled also showed that the weight increases in the sheet are usually far greater than the losses in weight of the roots, so that the net effect of gibberellic acid on the whole plant is to increase fresh weight and dry weight. If the shoots alone are considered, the dry weight increases are due partly to redistribution of dry matter between root and shoot, and partly due to greater dry matter synthesis by the plant. The carbon, nitrogen, phosphorus and ash contents of equal weights of material from treated and untreated plants do not differ greatly, though there appears possibly to be an increase in the percentage carbon content and a slight fall in ash, nitrogen and phosphorus. In any case, there is an undoubted great increase in the carbon assimilated per plant. This is a point of some interest; it could be due to the treated plants having a greater leaf area in which photosynthesis could take place or it could be due to an increase in the rate of carbon assimilation per unit area of leaf. In experiments where the necessary estimates of leaf area have been made it appears that the increased carbon assimilation is due to increased leaf area. There are qualitative differences in the carbon components of the treated plants. For example the total carbohydrate soluble in 80% ethanol is increased by about 75% over controls, and by chromatography of sap expressed from cytolysed plants, it has been found that the sucrose content is increased by about 25% and fructose and glucose concentration by about 100%. It appears therefore that, as a result of the treatment, glucose replaces sucrose as the main sugar constituent of the plants.

TABLE V

*Wheat: mean percentage increase or decrease per seedling after 3 weeks' growth resulting from gibberellic acid treatment*

| Expt. | Nutrient level | Height | FW shoot | DW shoot | FW root | DW root |
|---|---|---|---|---|---|---|
| G0 | low | °+44 | | +5 | | **−24 |
| | high | °+80 | | **+39 | | +3 |
| G1 | low | **+86 | +9 | **+24 | *−24 | **−15 |
| | high | **+108 | *+37 | **+33 | *−13 | 0 |
| G2 | low | **+74 | **+26 | **+26 | °+21 | **−17 |
| | high | **+76 | °+11 | **+14 | °−26 | **−14 |
| G3 | low | **+93 | °+17 | **+16 | °−3 | **−34 |
| | high | **+09 | °+5 | −2 | °−2 | −16 |

**Statistically significant (P=.01).
*Statistically significant (P=.05).
° Not statistically analysed.
FW=fresh weight.
DW=dry weight.

The effect of gibberellic acid on pea seedlings growing in water culture is even more striking than the effect on wheat seedlings. The height of the plant is greatly increased—in some experiments the seedlings produced have been five times the height of control plants. This is due to a great increase in the length of internodes. The plants are much paler in colour than control plants.

The effects on the chemical composition of pea seedlings is similar to the effects on wheat seedlings. There is a great increase in fresh weight of shoots and a smaller, but still considerable increase in dry weight. Fresh weight and dry weight of roots falls as a result of gibberellic acid treatment. There is an increase in the amount of carbon, nitrogen, ash, phosphorus and potassium per plant in the shoots, though in terms of percentage of dry weight the content of all these except carbon fell slightly. In the roots all these fall in amount.

The amount of carbohydrate soluble in 80% ethanol increased, as a result of gibberellic acid treatment, by about 30% taking the plant as a whole, by 40% if the shoots only were considered. As in the case of wheat, the glucose content of expressed sap was markedly increased.

Reduced root growth is not necessarily obtained under all conditions. For example when gibberellic acid is applied to pea shoots, in a lanolin paste, increased weight of both roots and shoots is obtained.

The effect on pea seedlings of some derivatives of gibberellic acid is shown in Table VI.

TABLE VI

| Compound | Applied through roots | Applied through leaves |
|---|---|---|
| Acetyl gibberellic acid | high activity (equal to GA). | high activity (equal to GA). |
| Diacetyl gibberellic acid | high activity | high activity. |
| Methyl acetyl gibberellate | moderate activity | slight activity. |
| Monobenzoyl gibberellic acid. | high activity | high activity (equal to GA). |
| Ethyl gibberellate | moderate activity | inactive. |
| Butyl gibberellate | do | Do. |
| Butyl acetylgibberellate | high activity | Do. |
| iso-propyl acetylgibberellate. | moderate activity | Do. |
| iso-propyl gibberellate | high activity | Do. |
| Butyryl gibberellic acid | do | high activity (equal to GA). |
| Octyl gibberellate | moderate activity | inactive. |
| Ethyl acetylgibberellate | high activity | Do. |
| Phenyl acetylgibberellate | do | not tested. |
| Sodium gibberellate sesquihydrate. | do | high activity (equal to GA). |
| Potassium gibberellate sesquihydrate. | high activity (equal to GA). | Do. |
| Calcium gibberellate sesquihydrate. | do | Do. |

Applied through roots in culture solution containing the compound at a concentration of 10 p. p. m.
Applied through leaves in doses of 10γ/plant in .002 ml. alcohol.
GA=gibberellic acid.

The degree of activity of gibberellic acid derivatives appears to fall off with increasing substitution. For example, when gibberellic acid is esterified with higher alcohols the degree of activity falls off as may be seen in Table VI, though the octyl ester still retains some activity. On the other hand, although acetyl gibberellic acid is as active as gibberellic acid itself, as this substituted acid is esterified with alcohols of higher molecular weight so the activity of the ester falls off, as will be noted in Table VI, until it is negligible, in this particular case, in octyl acetyl gibberellate. Again, although diacetyl gibberellic acid is quite active, the methyl ester is substantially inactive.

Where a derivative is active when applied through the roots but not when applied through the leaves this may in fact be due to hydrolysis of the derivative in the soil yielding free gibberellic acid.

The fact that great increases in yield of dry matter may be obtained by treatment of wheat and pea seedlings with very small quantities of gibberellic acid is of considerable practical importance. Experiments in which grass crops were treated with gibberellic acid have confirmed that similar increases in dry matter yield can be obtained under field conditions.

In a pasture trial it was found that applications of gibberellic acid (1–4 oz./acre) as an aqueous spray brought about an increase in the dry matter yield of herbage at the first cut. (See following Table VII.) 0, 1, 2, 3 and 4 oz. gibberellic acid /acre were applied along with 0, 3 and 6 cwts. fertiliser* per acre to 1/800 acre

*The fertiliser was one containing 12% N, 12% total $P_2O_5$ (11.9% water soluble) and 15% $K_2O$.

plots on April 13, 1954, and the plots harvested on May 11, 1954.

TABLE VII

Mean dry matter yields of herbage (cwts./acre)

| Fertiliser (cwt./acre) | Gibberellic Acid (oz./acre) | | | | |
|---|---|---|---|---|---|
| | 0 | 1 | 2 | 3 | 4 |
| 0 | 10.03 | 16.41 | 18.39 | 19.16 | 18.72 |
| 3 | 14.75 | 19.87 | 22.16 | 21.65 | 21.85 |
| 6 | 18.29 | 21.72 | 21.81 | 22.42 | 23.27 |

Although substantial increases in dry matter yield were obtained without application of fertiliser, the grass plants were yellow and mechanically weak. However the plants on the gibberellic acid plus fertiliser (6 cwt./acre) plots were normal in appearance.

In general, it has been found that, in order to obtain the most beneficial results from the growth-promoting properties of gibberellic acid, treatment with the acid should be accompanied by treatment with additional quantities of plant nutrients, particularly nitrogen, which may be derived from a mixed fertilizer as above or from a source of nitrogen such as urea, sulphate of ammonia and nitrate of ammonia. A suitable rate of application of nitrogen which will substantially reduce or prevent the yellowing of the foliage on stimulation of growth is from 40–80 lb. N/acre.

One of the most important aspects of the present invention in relation to increased production of grass is that applications of gibberellic acid or an active derivative to grass land in the early spring, autumn or winter will cause the grass to grow under conditions of low light intensity and low temperature, i. e., conditions under which grass could not be stimulated into growth merely by application of a fertiliser. As a result, it is possible to extend the grass growing season and so obtain an earlier "bite" for livestock or an earlier cut for hay or silage. The simultaneous application of fertiliser leads of course to earlier use of the fertiliser in the earlier growth.

The gibberellic acid or an active derivative thereof may be applied in a dry form, i. e., as a powder, in admixture with a diluent which may be inert, e. g., china clay, fuller's earth, kieselguhr or lime, or which may contain a plant nutrient, e. g. mixed fertiliser or sulphate or nitrate of ammonia. Alternatively it may be applied as a spray, the active constituent then being dispersed in water. The aqueous dispersion may additionally contain plant nutrients such as urea or an ammonium salt.

Preferably the active constituent is so applied that its main effect is achieved by absorption through the foliage rather than through the roots since in the latter circumstances it may depress the rate of root growth. Preferably therefore it is applied as a spray, more preferably as a low volume spray, say at a rate of 10 or 20 gallons of spray to the acre to give a distribution of 2 oz./acre of gibberellic acid or equivalent of active derivative.

A convenient method of preparing an aqueous dispersion of gibberellic acid or an active derivative is to dissolve the acid or derivative in a water-miscible solvent and pour the solution with stirring into water.

Although we have described processes for isolating pure gibberellic acid from cultures of *Gibberella fujikuroi*, the pure material being required for chemical analysis and general identification of the acid, it will be obvious that for agricultural purposes it will not be necessary to isolate the pure acid, a crude concentrate being adequate for treatment of plants or of ground in which plants are growing or are to grow.

We claim:
1. A method for promoting the growth of plants com- prising treating said plants with a gibberellic acid compound having the formula

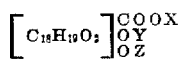

said acid being characterized by the following properties:

Molecular formula, $C_{19}H_{22}O_6$
Melting point, 233–235° C. (vigorous gas evolution)
Optical rotation, $[a]_D^{20}$ +83° (c., 0.51 in methanol)
Monomethyl ester:
    Melting point, 209–210° C.
    Optical rotation, $[a]_D^{16}$ +75° (c., 0.5 in ethanol)
p-Bromophenacyl ester:
    Melting point, 218–219° C.
    Hydrolysis with boiling mineral acid—1 mole carbon dioxide evolved
Acetyl derivative:
    Melting point, 233–234° C. (dec.)
    Optical rotation, $[a]_D^{17}$ +152° (c., 0.5 in ethanol)
Methyl acetyl gibberellate:
    Melting point, 180–181° C.
    Optical rotation, $[a]_D^{18}$ +150° (c., 0.4 in ethanol)

Absorption bands in the infra-red region of the spectrum when suspended in the form of a "Nujol" mull at the following frequencies expressed in reciprocal centimeters:

| Absorption 55% and above | Absorption 45%–54% |
|---|---|
| 3,460<br>1,752<br>1,191<br>1,172<br>1,032<br>1,021 | 3,390<br>1,328<br>1,263<br>1,250<br>1,156<br>1,128<br>1,105<br>976<br>889<br>778 | and wherein X is selected from the group consisting of hydrogen, alkali metal, alkaline earth metal, lower alkyl, phenyl, hydroxyethyl, and para-bromo-phenacyl, and wherein Y and Z are each selected from the group consisting of hydrogen, and

where R is selected from the group consisting of lower alkyl, and phenyl.

2. The method of claim 1 in which the compound is dispersed in water as diluent and is applied as a spray.

3. The method of producing gibberellic acid, said acid being characterized by the following properties:

Molecular formula, $C_{19}H_{22}O_6$
Melting point, 233–235° C. (vigorous gas evolution)
Optical rotation, $[a]_D^{20}$ +83° (c., 0.51 in methanol)
Monomethyl ester:
    Melting point, 209–210° C.
    Optical rotation, $[a]_D^{16}$ +75° (c., 0.5 in ethanol)
p-Bromophenacyl ester:
    Melting point, 218–219° C.
    Hydrolysis with boiling mineral acid—1 mole carbon dioxide evolved
Acetyl derivative:
    Melting point, 233–234° C. (dec.)
    Optical rotation, $[a]_D^{17}$ +152° (c., 0.5 in ethanol)
Methyl acetyl gibberellate:
    Melting point, 180–181° C.
    Optical rotation, $[a]_D^{18}$ +150° (c., 0.4 in ethanol)

Absorption bands in the infra-red region of the spectrum when suspended in the form of a "Nujol" mull at the following frequencies expressed in reciprocal centimeters:

| Absorption 55% and above | Absorption 45%–54% |
|---|---|
| 3,460<br>1,752<br>1,191<br>1,172<br>1,032<br>1,021 | 3,390<br>1,328<br>1,263<br>1,250<br>1,156<br>1,128<br>1,105<br>976<br>889<br>778 | comprising cultivating Gibberella fujikuroi in an aqueous medium including a carbon and nitrogen source wherein said carbon is in excess, and continuing cultivation after active growth has ceased.

4. A method for producing gibberellic acid, said acid being characterized by the following properties:

Molecular formula, $C_{19}H_{22}O_6$
Melting point, 233–235° C. (vigorous gas evolution)
Optical rotation, $[a]_D^{20}$ +83° (c., 0.51 in methanol)
Monomethyl ester:
    Melting point, 209–210° C.
    Optical rotation, $[a]_D^{16}$ +75° (c., 0.5 in ethanol)
p-Bromophenacyl ester:
    Melting point, 218–219° C.
    Hydrolysis with boiling mineral acid—1 mole carbon dioxide evolved
Acetyl derivative:
    Melting point, 233–234° C. (dec.)
    Optical rotation, $[a]_D^{17}$ +152° (c., 0.5 in ethanol)
Methyl acetyl gibberellate:
    Melting point, 180–181° C.
    Optical rotation, $[a]_D^{18}$ +150° (c., 0.4 in ethanol)

Absorption bands in the infra-red region of the spectrum when suspended in the form of a "Nujol" mull at the following frequencies expressed in reciprocal centimeters:

| Absorption 55% and above | Absorption 45%–54% |
|---|---|
| 3,460<br>1,752<br>1,191<br>1,172<br>1,032<br>1,021 | 3,390<br>1,328<br>1,263<br>1,250<br>1,156<br>1,128<br>1,105<br>976<br>889<br>778 | comprising cultivating Gibberella fujikuroi in an aqueous medium including a carbon and nitrogen source wherein said carbon is in excess and in amount equivalent to 2–30% w./v. of glucose and the nitrogen is in amount of 0.01–0.5%, and continuing the cultivation after active growth has ceased.

5. The method for producing gibberellic acid, said acid being characterized by the following properties:

Molecular formula, $C_{19}H_{22}O_6$
Melting point, 233–235° C. (vigorous gas evolution)
Optical rotation, $[a]_D^{20}$ +83° (c., 0.51 in methanol)
Monomethyl ester:
    Melting point, 209–210° C.
    Optical rotation, $[a]_D^{16}$ +75° (c., 0.5 in ethanol)

p-Bromophenacyl ester:
    Melting point, 218–219° C.
    Hydrolysis with boiling mineral acid—1 mole carbon dioxide evolved
Acetyl derivative:
    Melting point, 233–234° C. (dec.)
    Optical rotation, $[a]_D^{17}$ +152° (c., 0.5 in ethanol)
Methyl acetyl gibberellate:
    Melting point, 180–181° C.
    Optical rotation, $[a]_D^{18}$ +150° (c., 0.4 in ethanol)

Absorption bands in the infra-red region of the spectrum when suspended in the form of a "Nujol" mull at the following frequencies expressed in reciprocal centimeters:

| Absorption 55% and above | Absorption 45%–54% |
|---|---|
|  | 3,390 |
|  | 1,328 |
| 3,460 | 1,263 |
| 1,752 | 1,250 |
| 1,191 | 1,156 |
| 1,172 | 1,128 |
| 1,032 | 1,105 |
| 1,021 | 976 |
|  | 889 |
|  | 778 | comprising cultivating *Gibberella fujikuroi* in an aqueous medium including a carbon and nitrogen source wherein said carbon is in excess in amount equivalent to 10–30% glucose and the nitrogen is in amount of 0.07–0.1%, the carbon source being selected from the group consisting of glucose, sucrose and glycerine, and the nitrogen source being selected from the group consisting of an ammonium salt, a nitrate, and a protein digest, and continuing the cultivation after active growth has ceased, filtering the resulting culture, extracting said culture filtrate with activated charcoal, continuously eluting the charcoal containing the extract with acetone, evaporating the eluate under reduced pressure to give an aqueous concentrate, extracting said concentrate with ethyl acetate, extracting the resulting ethyl acetate solution with a phosphate buffer ($KH_2PO_4$ and KOH), extracting the resulting buffer extract with ethyl acetate, concentrating the resulting extract to obtain crude gibberellic acid crystals, purifying said crystals by adding light petroleum to a solution thereof in boiling ethyl acetate and thereafter separating the pure gibberellic acid.

6. Gibberellic acid compounds having the formula

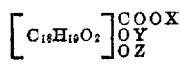

said acid being characterized by the following properties:

Molecular formula, $C_{19}H_{22}O_6$
Melting point, 233–235° C. (vigorous gas evolution)
Optical rotation, $[a]_D^{20}$ +83° (c., 0.51 in methanol)
Monomethyl ester:
    Melting point, 209–210° C.
    Optical rotation, $[a]_D^{16}$ +75° (c., 0.5 in ethanol)
p-Bromophenacyl ester:
    Melting point, 218–219° C.
    Hydrolysis with boiling mineral acid—1 mole carbon dioxide evolved
Acetyl derivative:
    Melting point, 233–234° C. (dec.)
    Optical rotation, $[a]_D^{17}$ +152° (c., 0.5 in ethanol)
Methyl acetyl gibberellate:
    Melting point, 180–181° C.
    Optical rotation, $[a]_D^{18}$ +150° (c., 0.4 in ethanol)

Absorption bands in the infra-red region of the spectrum when suspended in the form of a "Nujol" mull at the following frequencies expressed in reciprocal centimeters:

| Absorption 55% and above | Absorption 45%–54% |
|---|---|
|  | 3,390 |
|  | 1,328 |
| 3,460 | 1,263 |
| 1,752 | 1,250 |
| 1,191 | 1,156 |
| 1,172 | 1,128 |
| 1,032 | 1,105 |
| 1,021 | 976 |
|  | 889 |
|  | 778 | and wherein X is selected from the group consisting of hydrogen, alkali metal, alkaline earth metal, lower alkyl, phenyl, hydroxyethyl, and para-bromo-phenacyl, and wherein Y and Z are each selected from the group consisting of hydrogen, and

where R is selected from the group consisting of lower alkyl, and phenyl.

7. A plant nutrient comprising a gibberellic acid compound having the formula

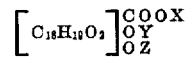

and a nitrogen containing fertilizer in which said compound is uniformly distributed, said acid being characterized by the following properties:

Molecular formula, $C_{19}H_{22}O_6$
Melting point, 233–235° C. (vigorous gas evolution)
Optical rotation, $[a]_D^{20}$ +83° (c., 0.51 in methanol)
Monomethyl ester:
    Melting point, 209–210° C.
    Optical rotation, $[a]_D^{16}$ +75° (c., 0.5 in ethanol)
p-Bromophenacyl ester:
    Melting point, 218–219° C.
    Hydrolysis with boiling mineral acid—1 mole carbon dioxide evolved
Acetyl derivative:
    Melting point, 233–234° C. (dec.)
    Optical rotation, $[a]_D^{17}$ +152° (c., 0.5 in ethanol)
Methyl acetyl gibberellate:
    Melting point, 180–181° C.
    Optical rotation, $[a]_D^{18}$ +150° (c., 0.4 in ethanol)

Absorption bands in the infra-red region of the spectrum when suspended in the form of a "Nujol" mull at the following frequencies expressed in reciprocal centimeters:

| Absorption 55% and above | Absorption 45%–54% |
|---|---|
|  | 3,390 |
|  | 1,328 |
| 3,460 | 1,263 |
| 1,752 | 1,250 |
| 1,191 | 1,156 |
| 1,172 | 1,128 |
| 1,032 | 1,105 |
| 1,021 | 976 |
|  | 889 |
|  | 778 | and wherein X is selected from the group consisting of hydrogen, alkali metal, alkaline earth metal, lower alkyl, phenyl, hydroxy-ethyl, and para-bromo-phenacyl, and wherein Y and Z are each selected from the group consisting of hydrogen, and

where R is selected from the group consisting of lower alkyl, and phenyl.

8. A gibberellic acid compound as claimed in claim 6 wherein said compound is the alkali metal salt of gibberellic acid.

9. A gibberellic acid compound as claimed in claim 6 wherein said compound is the alkaline earth metal salt of gibberellic acid.

10. A gibberellic acid compound as claimed in claim 6 wherein said compound is the sodium salt of gibberellic acid.

11. A gibberellic acid compound as claimed in claim 6 wherein said compound is the potassium salt of gibberellic acid.

References Cited in the file of this patent

UNITED STATES PATENTS 2,749,230   Kaplan _____ June 5, 1956

OTHER REFERENCES

Yabuta et al.: Chemical Abstracts, vol. 33, columns 8238(a) to 8239(a), 1939.

Yabuta et al.: Chemical Abstracts, vol. 44, columns 10814(a) to 10817(c), 1950.

Sumiki: Chemical Abstracts, vol. 48, columns 12920(a) to 12921, 1954 (abstract of 1952 article).

Kato: Chemical Abstracts, vol 48, column 8886(i), 1954 (abstract of 1951 article).

Formula Index of Chemical Abstracts, vol. 47, page 264F, 1954 (refers to column 6442(i) and abstract of 1952 source).

Formula Index of Chemical Abstracts, vol. 48, page 299F, 1953 (refers to column 5204(d)).

Gibberellins for Growth, Chem. and Eng. News, pages 4496 and 4501 (Sept. 17, 1957).

Report of the Chief of the Bureau of Agr. and Ind. Chem., U. S. Dept. of Agr. Res. Adm., 1953, page 74.

Stodola et al.: Arch. Biochem., vol. 54, pages 240-245 (1955).

Cross: J. Chem. Soc., 1954, pages 4670-76.